(12) United States Patent
Hellsten

(10) Patent No.: US 7,561,096 B2
(45) Date of Patent: Jul. 14, 2009

(54) SUBSURFACE IMAGING RADAR

(75) Inventor: Hans Hellsten, Linkoping (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 12/028,301

(22) Filed: Feb. 8, 2008

(65) Prior Publication Data

US 2008/0246647 A1 Oct. 9, 2008

(30) Foreign Application Priority Data

Mar. 2, 2007 (EP) .................................. 07446004

(51) Int. Cl.
*G01S 13/90* (2006.01)
(52) U.S. Cl. ..................... 342/22; 342/25 A; 342/188; 342/179; 342/180
(58) Field of Classification Search ............ 342/22, 342/25 R, 25 A–25 F, 27, 188, 179, 180
See application file for complete search history.

(56) References Cited

U.S. PATENT DOCUMENTS

| | | | | | |
|---|---|---|---|---|---|
| 5,442,364 | A | * | 8/1995 | Lee et al. ................. | 342/372 |
| 5,502,444 | A | * | 3/1996 | Kohlberg .................. | 342/22 |
| 5,673,050 | A | * | 9/1997 | Moussally et al. .......... | 342/22 |
| 5,969,662 | A | * | 10/1999 | Hellsten ................. | 342/25 A |
| 6,094,157 | A | * | 7/2000 | Cowdrick ................ | 342/22 |
| 6,738,009 | B1 | * | 5/2004 | Tsunoda ................. | 342/25 A |
| 6,982,666 | B2 | * | 1/2006 | Temes et al. .............. | 342/22 |
| 2007/0024489 | A1 | * | 2/2007 | Cerwin .................. | 342/22 |
| 2008/0246647 | A1 | * | 10/2008 | Hellsten ................. | 342/22 |

FOREIGN PATENT DOCUMENTS

| | | | | |
|---|---|---|---|---|
| GB | 2083725 | A | * | 3/1982 |
| JP | 61022272 | A | * | 1/1986 |
| JP | 62119483 | A | * | 5/1987 |

\* cited by examiner

*Primary Examiner*—John B Sotomayor
(74) *Attorney, Agent, or Firm*—Schwegman, Lundberg & Woessner, P.A.

(57) ABSTRACT

The present invention can be summarized by use of a diffraction limited SAR giving large integration angle and a short depth of field which gives that energy from underground targets is focused independently at different depths to enable 3d imaging. The radar device according to the invention should be implemented by considering the following parameters: Choice of the appropriate illumination geometry, i.e. elevation angle $\theta$, and the appropriate use of low frequency diffraction limited SAR processing to obtain 3D imaging, and the choice of an appropriately low radar frequency.

30 Claims, 6 Drawing Sheets

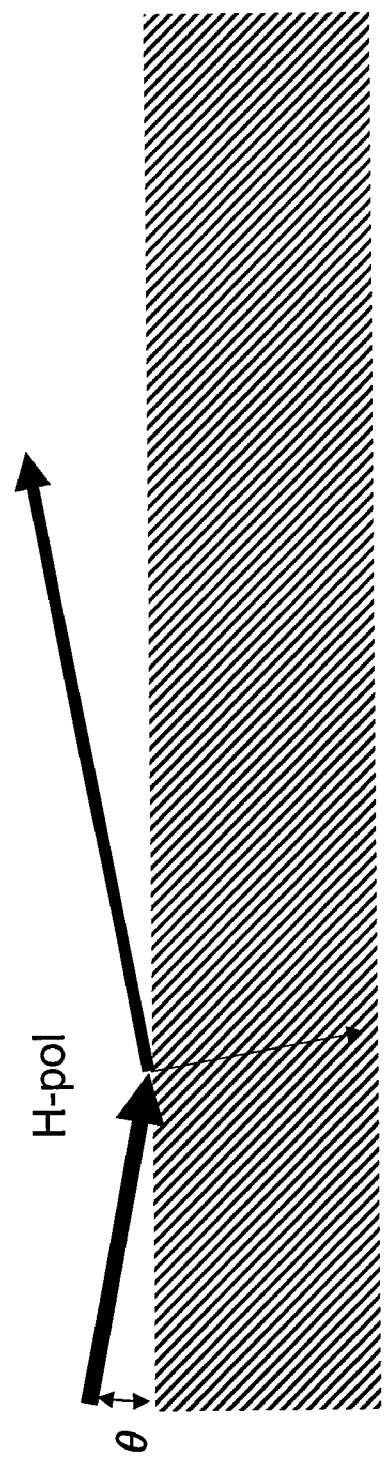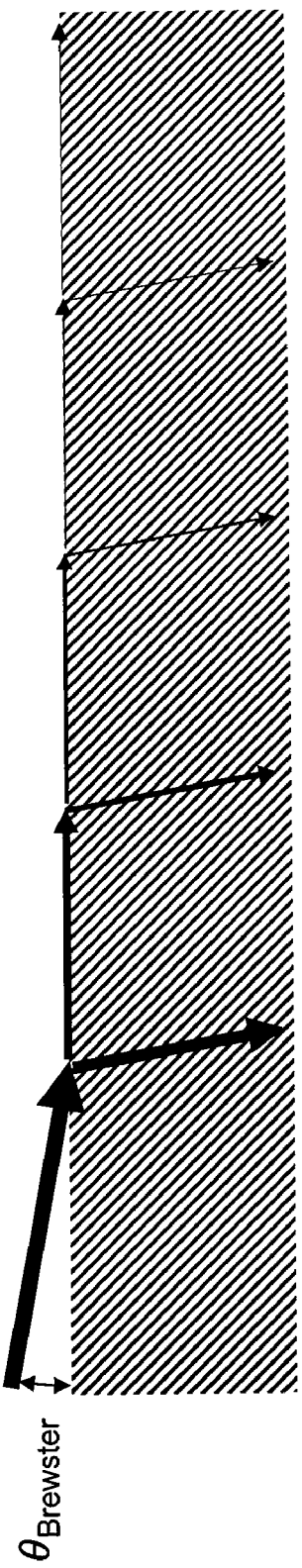

SUBSURFACE IMAGING RADAR

RELATED APPLICATION

This application claims priority under 35 U.S.C. 119 to European Patent Application No. 07446004.9, filed Mar. 2, 2007, which application is incorporated herein by reference and made a part hereof.

TECHNICAL FIELD

The invention relates to a subsurface imaging radar device comprising a transmitting unit and a receiving unit, the transmitting unit being arranged to transmit a first radio wave signal in a lobe towards a selected ground area at a selected elevation angle θ to the ground area. The invention also refers to a method for a subsurface imaging radar device.

BACKGROUND ART

In the arid and open areas of many current conflicts burying objects is a commonplace element of military tactics. The rationale is that this is often the single way of concealing them, and very simple to do in e.g. sandy terrain. These objects can be mines, concealed weapons or tunnels and bunkers. Correspondingly there is a strong requirement for efficient means of detecting these types of buried objects.

The circumstances and purposes for buried object detection vary. Still surveillance capacity linked to a high probability of detection is a general concern. For instance a military transport en route along a road must posses a possibility to detect the mines which may harm it when traveling at some reasonable speed. In contrast after a peace treaty there is very strong requirement for efficient demining requiring all mines to be found and deactivated. They may be spread over large areas, and not always in a fashion which is well controlled. In this case there is no real time demand though the surveillance task is often so large that surveillance capacity must be large. Searching for concealed weapons, is often delimited to certain areas and may not have any immediate real time requirement. However there may be a strong pressure to obtain results within definite deadlines so surveillance capacity is a concern in this case too.

An emerging application area is the restoration of former military storage and training areas to civilian land use. The areas can be severely polluted by unexploded ordonance, and harmful waste. The location of waste deposits may have been forgotten through the dramatic organizational changes in e.g. Eastern Europe.

When surveillance requirements are large the use of handheld mine detection devices would be inefficient. Also self-moving detection devices depending on magnetostatic or electrostatic effects (thus measuring the ground permeability or dielectricity constant) have low surveillance capacity. The reason is that static fields decline at short ranges, calling for careful and slow movements in the detection process. In contrast, radar is based on electromagnetic radiation. Since range attenuation of electromagnetic radiation is smaller than that of electrostatic fields, radar seems to be the principle to be preferred for large coverage subsurface object detection.

Subsurface objects may be small, and their signatures very weak. Therefore a detection device must sense only a small portion of the ground where the disturbance of the ground due to the presence of an object will be relatively noticeable. A problem with radar operating at larger surveillance ranges is therefore how to obtain sufficient resolution, isolating small volumes of the ground. The principle of synthetic aperture radar, SAR, is a well-known method to obtain high 2-dimensional resolution of the ground surface.

A Synthetic Aperture Radar, SAR, can be used from the ground and from the air. An airborne SAR produces two-dimensional images perpendicular to the aircraft path of flight. One dimension in the image is called range (or cross track) and is a measure of the "line-of-sight" distance from the radar to the target. Range measurement and resolution are achieved in synthetic aperture radar in the same manner as most other radars: Range is determined by precisely measuring the time from transmission of a pulse to receiving the echo from a target and, in the simplest SAR, range resolution is determined by the transmitted pulse width, i.e. narrow pulses yield fine range resolution.

The other dimension is called azimuth (or along track) and is perpendicular to range over the ground surface. It is the ability of SAR to produce relatively fine azimuth resolution that differentiates it from other radars. To obtain fine azimuth resolution, a physically large antenna is needed to focus the transmitted and received energy into a sharp beam. The sharpness of the beam defines the azimuth resolution. Similarly, optical systems, such as telescopes, require large apertures (mirrors or lenses which are analogous to the radar antenna) to obtain fine imaging resolution. Since SARs are much lower in frequency than optical systems, even moderate SAR resolutions require an antenna physically larger than can be practically carried by an airborne platform: antenna lengths several hundred meters long are often required. However, airborne radar could collect data while flying this distance and then process the data as if it came from a physically long antenna. The distance the aircraft flies in synthesizing the antenna is known as the synthetic aperture. A narrow synthetic beamwidth results from the relatively long synthetic aperture, which yields finer resolution than is possible from a smaller physical antenna.

While this section attempts to provide an intuitive understanding, SARs are not as simple as described above. For even moderate azimuth resolutions, a target's range to each location on the synthetic aperture changes along the synthetic aperture. In SAR the energy reflected from the target must be "mathematically focused" to compensate for the range dependence across the aperture prior to image formation. When the aperture is large the SAR can give resolution near the radar wavelength which gives a sensitive focus and objects will vanish in the SAR image unless properly focused.

However, the previously known SAR cannot be used for underground detection since the electromagnetic energy cannot penetrate the ground sufficiently, but is reflected over the surface.

Hence, there remains a need for an improved radar that can be used for underground imaging.

DISCLOSURE OF INVENTION

The invention relates to a subsurface imaging radar device comprising a transmitting unit and a receiving unit. The transmitting unit being arranged to transmit a first radio wave signal in a lobe towards a selected ground area at a selected elevation angle θ close to a horizontal plane in the ground area so that a significant part of the energy in a vertically polarized signal, with reference to the ground, is trapped in a surface wave mode which is successively tapped by refraction into the ground area. Here the ground area is so small that the curvature of the earth can be disregarded so that the ground area can be approximated with a horizontal plane.

It is advantageous if at least 10% of the energy of the first signal is refracted into the ground area, since the radar device according to the invention has been proven to perform well for when at least 10% of the energy of the first signal is refracted into the ground area. As an example, experiments have shown that the radar device according to the invention with an inclination angle θ=1 relative the ground area has a energy refraction of 25% into the ground of the first signal.

The optimal angle θ is the so called Brewster angle which will be explained further below. According to the above, the radar device is not limited to the Brewster angle, but the radar device may be used in a range comprising the Brewster angle. However, at the Brewster angle 100% of the energy in the first signal is refracted into the ground.

The transmitting unit is arranged to transmit the first signal as a signal being polarized, with reference to the ground, so that the majority of the energy of the first signal is refracted into the ground. The transmitting unit is arranged to transmit the first signal with a wavelength being longer than the size of selected objects above the surface, but short enough for detection of selected objects being subsurface. The transmitting unit is arranged to transmit the first signal with a high fractional bandwidth being more than 10% of the centre frequency of the first signal for high range resolution. The radar device is a wavelength resolution limited synthetic aperture radar having an azimuth resolution close to or identical to the wavelength of the first signal in order to obtain high azimuth resolution.

In one embodiment of the invention, the bandwidth is more than 10% of the centre frequency of the first signal for high range resolution when the frequency is above 200 Mhz.

In another embodiment of the invention, the bandwidth is more than 25% of the centre frequency of the first signal for high range resolution when the frequency is between 50 Mhz and 200 Mhz.

The receiving unit is arranged to receive a second signal being the reflected first signal from the selected ground area.

The radar device is advantageously a synthetic aperture radar, SAR, but with the difference from prior art that the SAR according to the present invention is a wavelength resolution limited synthetic aperture radar for obtaining different images on different dielectric depth under the ground surface giving a three dimensional imaging of the ground area. The SAR according to the invention operates at the wavelength limit, i.e. at the diffraction limit. The technology of diffraction limited SAR for an ultimate azimuth resolution, i.e. close to the wavelength of the first signal, is known in the so called CARABAS device and method described in SE 456117, SE 468184 and SE 511952. The documents teaches that if the radar device operates with anazimuth resolution close to the wavelength, a short depth of field is achieved which can be used for three dimensional imaging. This method used together with the claimed features give the desired subsurface imaging.

The SAR according to the present invention does not use horizontally polarized signals, but the transmitting unit is arranged to transmit the first signal as a signal being polarized essentially perpendicular to the ground area, i.e. vertically polarized.

A vertically polarized signal can be achieved by use of a transmitting antenna being mounted onto a ground vehicle or an aircraft. In the latter case the aircraft may fly at an angle to the ground, i.e. when flying up or down, which gives that the transmitting antenna will transmit a polarized signal being not exactly polarized perpendicular to the ground but plus or minus a few degrees from the 90°. The function of the radar device will then be lessened, but the radar device will still be in operation.

As mentioned before the elevation angle θ with respect to the ground area shall be in an angular interval comprising the Brewster angle, and most preferably close to or exactly the Brewster angle. The angle θ can deviate somewhat from the Brewster angle since the differences between vertical and horizontal polarization, with regard to refraction, are present in a fairly large angular interval around the Brewster angle. The largest difference between vertical and horizontal polarization is for an elevation angle θ in an interval between 0 and 40° and is most evident for an angle θ in an interval between 0 and 20°.

The use of SAR is conducted by low level of flight which gives small depression angels, i.e. low inclination giving small elevation angles, the use of vertical polarization is a requirement to achieve illumination both on the actual ground surface (rather than at some fraction of the wavelength above the surface) and to obtain refraction into the ground. The Brewster angle incidence is maximizing the surface/subsurface target response with respect to that from objects elevated from the ground.

As been stated above the radar device may be mounted onto an aircraft. The radar device then may comprise a transceiver comprising the transmitter and the receiver. The transmitter may comprise a transmit antenna with a vertical extension of less than half the wavelength of the transmitted first signal since the inventive radar device allows for a short enough range.

Regarding surface wave propagation, it was concluded above that for finite soil conductivity, launching a vertically polarized signal with an electric field inclined at the Brewster angle led to a refraction process creating a surface wave signal tapped by continuous refraction into the ground, but without any reflection component. This conclusion is significant for the practical difficulty of housing a low frequency vertically polarized antenna onboard an airborne SAR platform. It is not required that the transmit antenna has a vertical extension of more than half the wavelength, which in our case is about 1 meter. However even this length would be a concern for a small airborne system, mounted on e.g. an UAV. The fact that the radar signal can be a surface wave after refraction can be used to realize subsurface imaging radar by a bi-static arrangement. In such an arrangement the transmitting antenna can be close to the ground and launch a surface wave.

In another embodiment, the transmit antenna is mounted onto a ground vehicle moving at moderate speed in the x-direction. Being mounted on a vehicle the transmit antenna can be inclined at the Brewster angle and vertically extended a few meters to make the radiated beam vertically narrow and conversion of the radiated energy into a surface wave efficient. The receiving antenna can be smaller than the transmit antenna and can have a vertical extension less than half a wavelength and can thus be easily installed on an aircraft such as an unmanned aerial vehicle, UAV or a helicopter. The aircraft and thus the receiver would then, in a typical application, travel in a zigzag fashion above the transmitting ground vehicle, spanning the synthetic aperture by the amplitude of the zigzag motion. The aircraft has a higher speed than the ground which allows for zigzag motion. The aircraft flies in straight lines with as sharp turns as possible.

The present invention can be summarized by use of a diffraction limited SAR giving large integration angle and a short depth of field which gives that energy from underground targets is focused independently at different depths to enable 3d imaging. The radar device according to the invention should be implemented by considering the following parameters:
1. Choice of the appropriate illumination geometry, i.e. elevation angle θ.
2. The appropriate use of low frequency diffraction limited SAR processing to obtain 3D imaging
3. Choice of an appropriately low radar frequency. Experimentally is has been shown that frequencies in the ranges from 100-200 MHz performs well.

The low frequency gives that ground surface becomes smooth compared to the wavelength. A part of the signal then propagates along the surface and a part of the signal penetrates into the ground at a steep angle and with much shorter wavelength which gives that underground, subsurface, targets several times smaller than the wavelength can be detected by the radar If a high frequency was to be used the ground surface would appear chaotic compared to the wavelength. The signal would reflect off the ground surface in all directions. These signals tend to blind the radar to underground responses and should therefore not be used.

Below is a table for different ground materials. The table is not exhaustive but merely poses different examples.

|  | Brewster angle | Penetration Depth | Surface Range |
| --- | --- | --- | --- |
| Wet soil | 10° | 3.4 m | 112 m |
| Dry soil | 17° | 6 m | 998 m |
| Sand | 10° | 26 m | 850 m |

The index of refraction for ground is important since the λspace is divided by the index of refraction for calculating λground. A typical value for an index of refraction for ground is 5.

Optical Flatness Grass, small boulders, etc. gives that the Root Mean Square, RMS, height must be less than for example λspace/8. λspace is the wavelength in air.

Small target sensitivity: λground/2>0.2 m gives a wavelength λspace of 2 m which allows for an RMS ground roughness of 0.25 m and subsurface targets >0.2 m. λground is the wavelength in the ground.

The subsurface objects about 0.2 m are strong reflectors since they are resonant with the incoming radiation. Furthermore, the subsurface targets are often metallic objects being better reflectors than the less dense surroundings.

BRIEF DESCRIPTION OF DRAWINGS

The invention will below be described in connection to a number of drawings, wherein:

FIGS. 2a and 2b schematically show a comparison between a horizontally polarized beam and a vertically polarized beam;

FIG. 5 schematically shows a geometric mapping of events, and wherein.

EMBODIMENT(S) OF THE INVENTION

Figure 1:
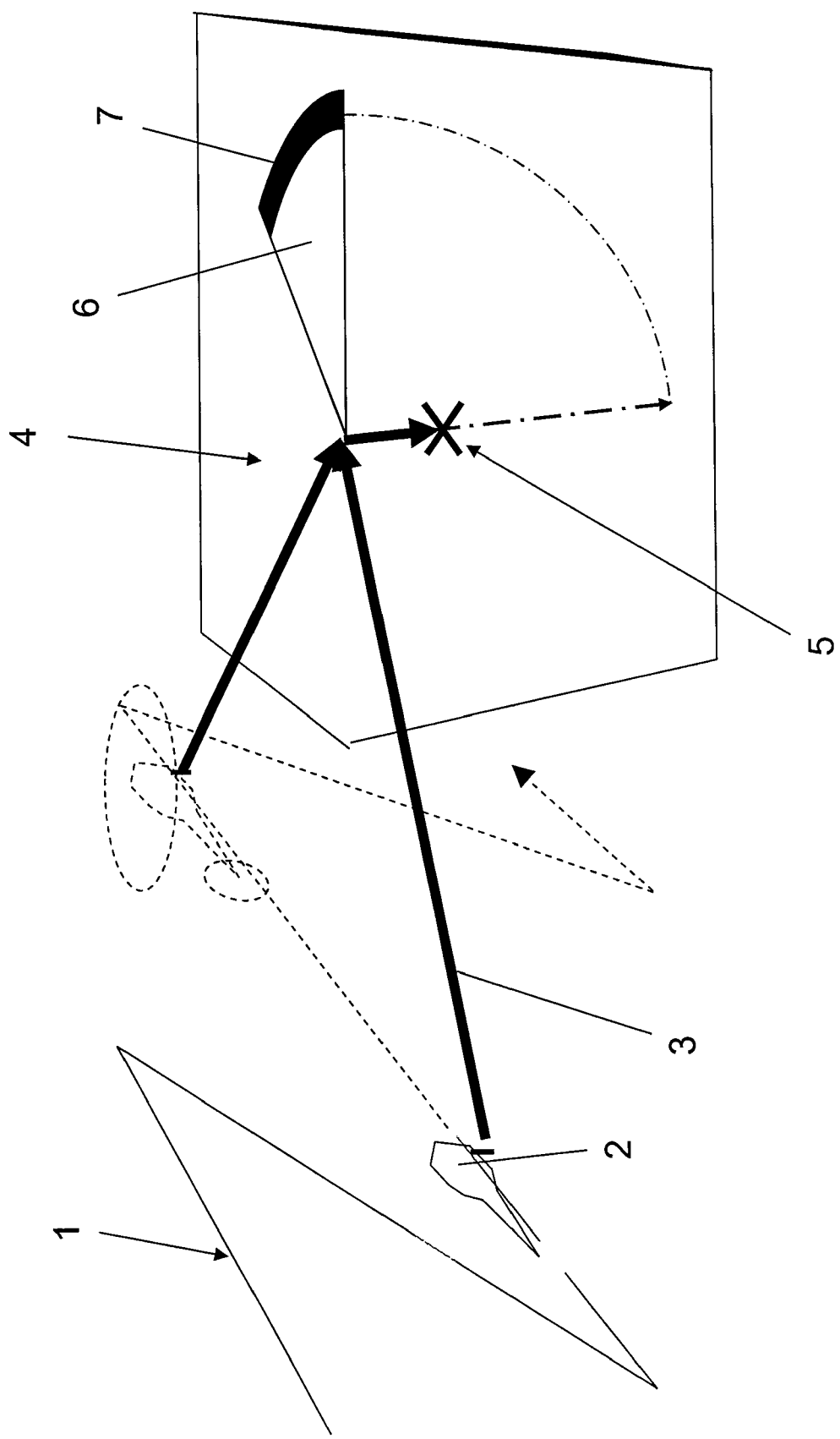
FIG. 1 schematically shows a flight path of a flying object comprising the radar device according to the invention.

FIG. 1 schematically shows a flight path 1 of an aircraft 2 comprising the radar device according to the invention. The aircraft 2 may be a helicopter or an aeroplane or any other suitable flying object that can carry a radar equipment according to the invention. FIG. 1 shows that a radar transmitter transmits a vertically polarized beam 3 towards a selected ground area 4 while flying in a zigzag pattern.

FIG. 1 show the principal of the system where an underground target 5 gives a target response on the surface 6 of the ground area 4 in the form of a semicircle 7. At each instant of the SAR registration the response from the target mixes with other reflections at the same electrical range. FIG. 1 indicates that due to a large integration angle and a shallow depression angle the target energy can be refocused to enable 3d imaging.

FIGS. 2a and 2b schematically show a comparison between a horizontally polarized beam H-pol and a vertically polarized beam V-pol.

FIG. 2a shows that the horizontally polarized beam H-pol is reflected essentially in its entirety. The horizontally polarized beam H-pol must be inclined with an elevation angle θ being steeper than 40° or all transmitted energy will go into surface reflection, see FIG. 3.

Figure 3:
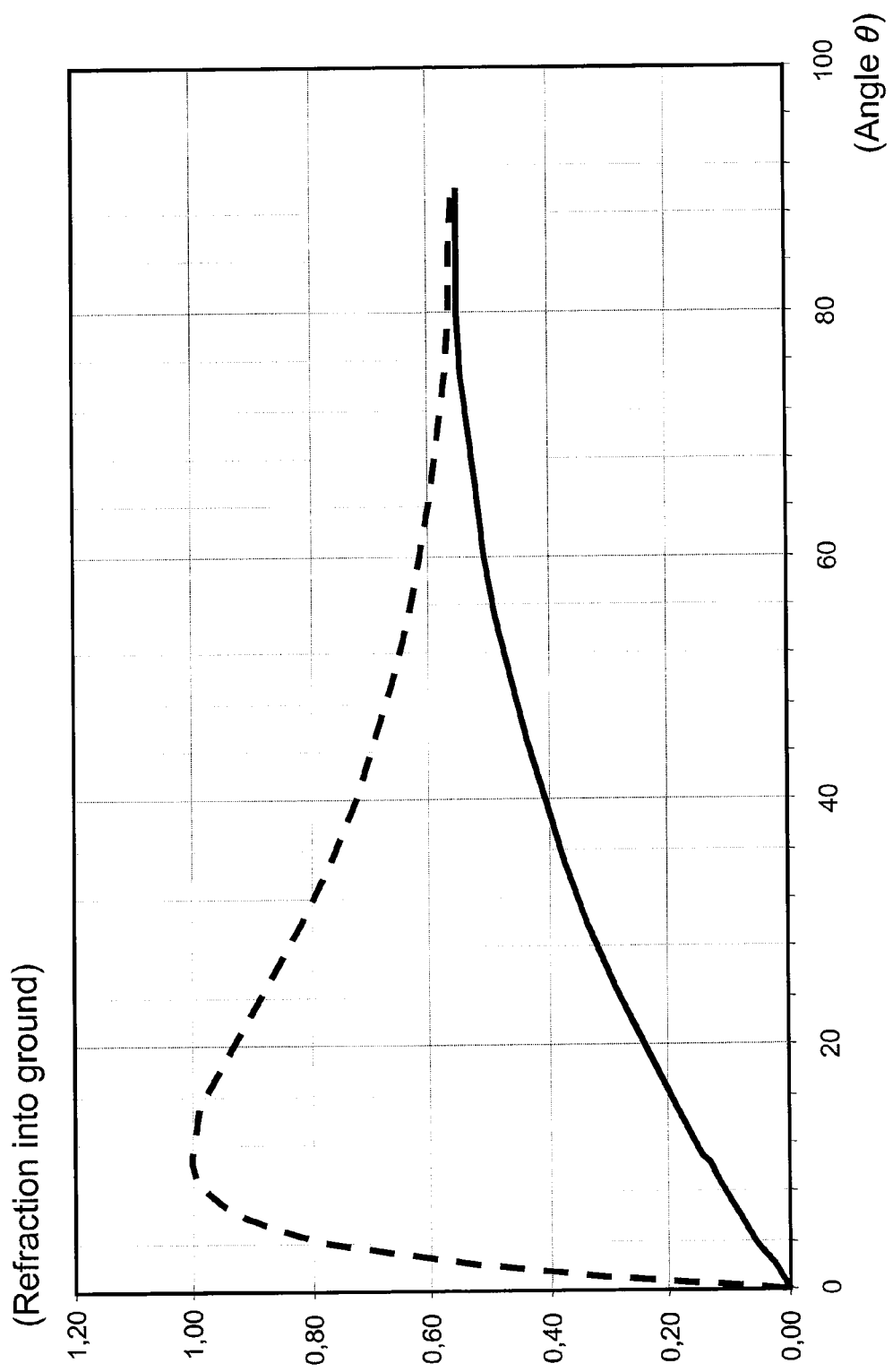
FIG. 3 schematically shows a diagram of a transmission coefficient as a function of depression angle for horizontal (fully drawn line) and vertical (dotted line) polarization.

FIG. 2b shows that for a vertically polarized beam V-pol at an elevation angle θ being the Brewster angle, the illumination geometry can be configured so that the entire signal is launched into the ground by refraction, see FIG. 3. This process is supported by a ground wave component if the surface is conductive.

FIG. 3 schematically shows a diagram of a transmission coefficient as a function of depression angle for horizontal polarization (fully drawn line) and vertical polarization (dotted line). The strong requirement for vertically polarized radiation when the imaging angle, i.e. the elevation angle θ, becomes shallow is evident in view of FIG. 3. FIG. 3 shows that the elevation angle θ can deviate somewhat from the Brewster angle since the differences between vertical and horizontal polarization, with regard to refraction, are present in a fairly large angular interval around the Brewster angle. The largest difference between vertical and horizontal polarization is for an angle θ in an interval between 0 and 40° and is most evident for an angle θ in an interval between 0 and 20°. Hence a suitable angle is in a range of plus minus 5-10° about the Brewster angle. This shallow depression angle is an indication that the radar device should be placed close to the ground for short range operation.

Figure 4:
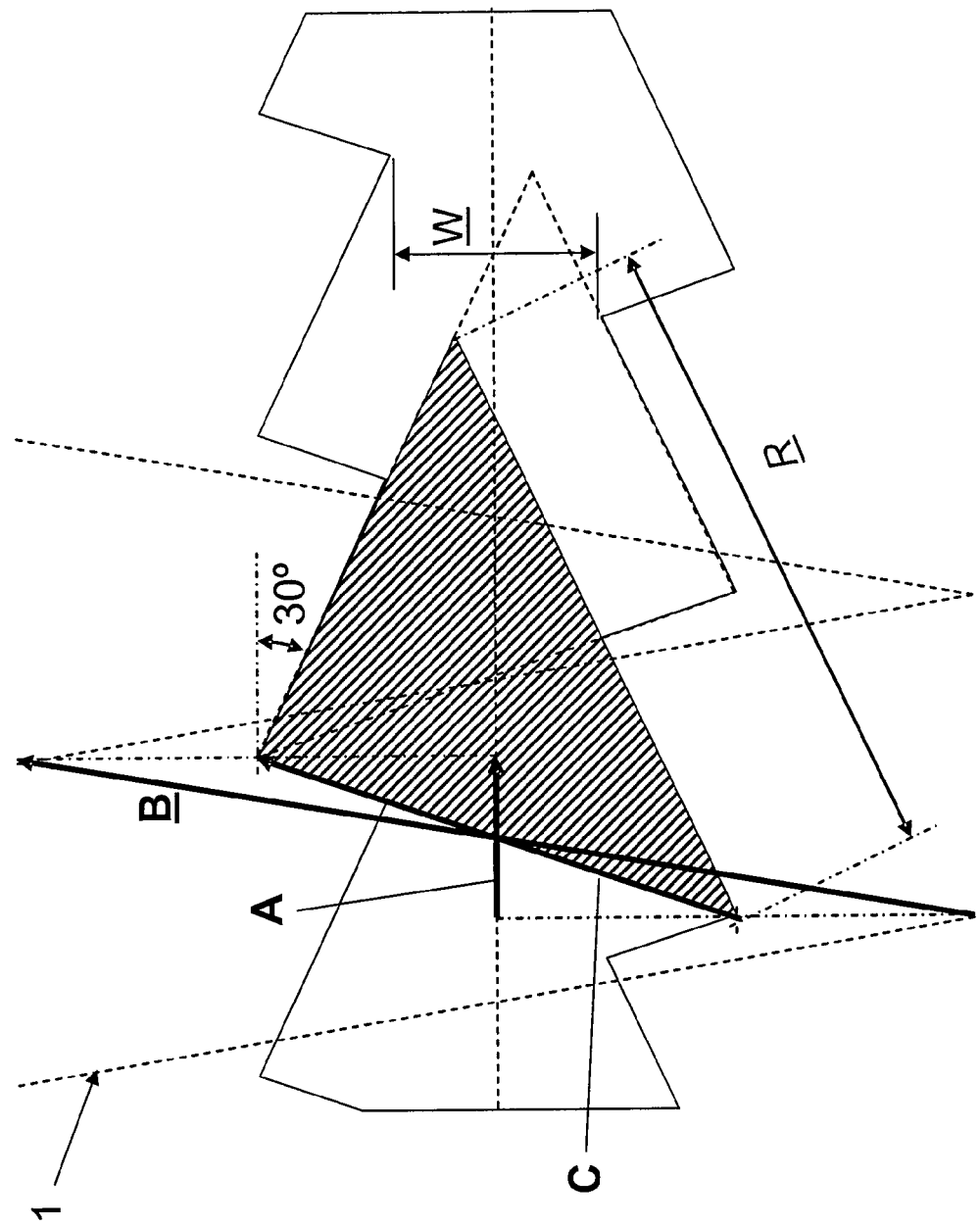
FIG. 4 schematically shows a covered surface (white area) by bistatic arrangement according to the invention.
Figure 6:
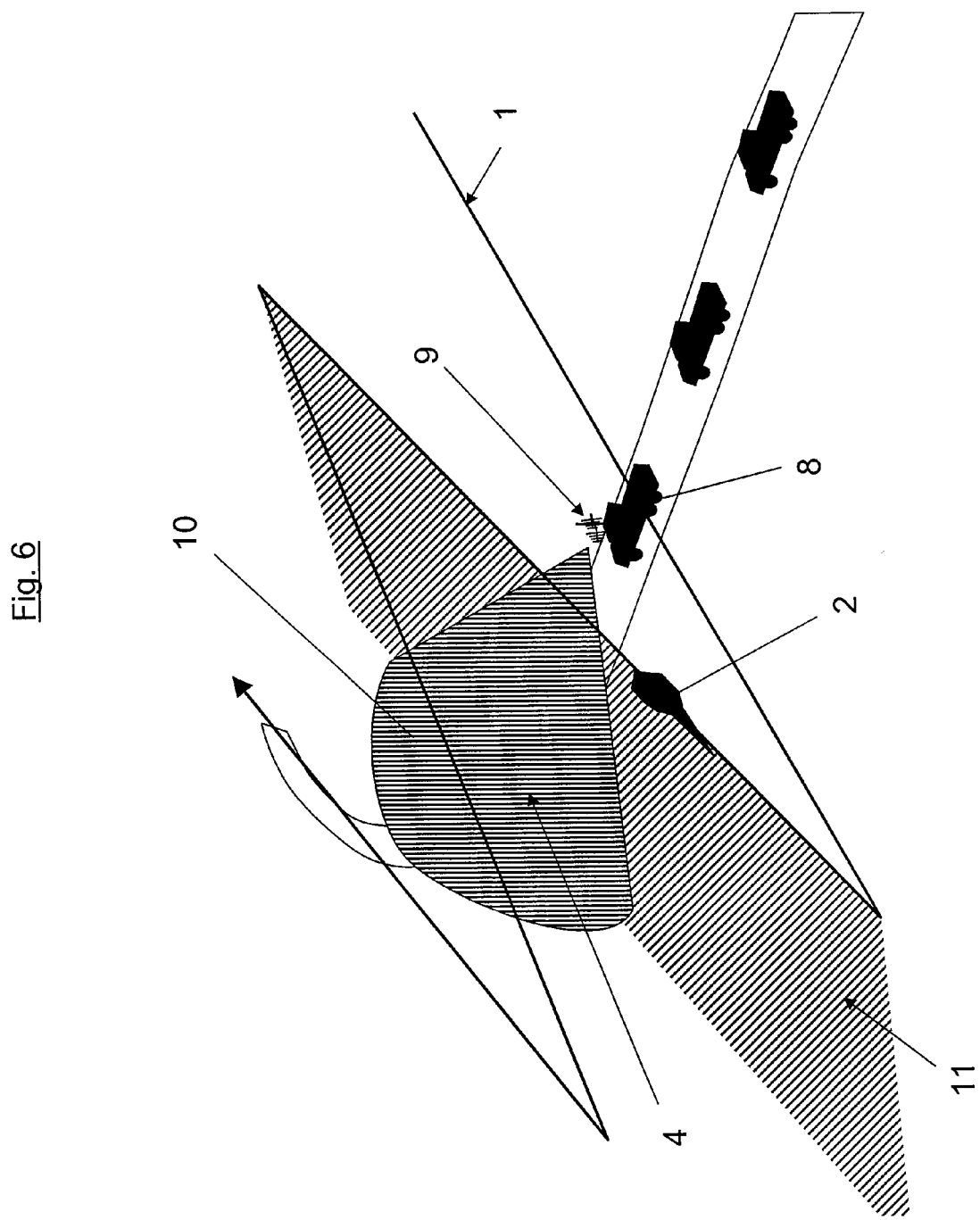
FIG. 6 schematically shows the radar according to the invention used in a combination of a ground vehicle and an air vehicle.

FIG. 4 schematically shows a covered surface (white area) by bistatic arrangement depicted in FIG. 6. The hashed area is imaged by a single leg B in the zigzag receiver movement. During the receiver motion along B the transmitter moves along A. The resulting phase center movement is along C. R is the average maximum range for transmitter and receiver. It will be set by the maximum range for which surface wave propagation can be expected for radar illumination.

Example: B: 20 m/s; A: 4 m/s; C: 240 m; W: 107 m

Figure 5:
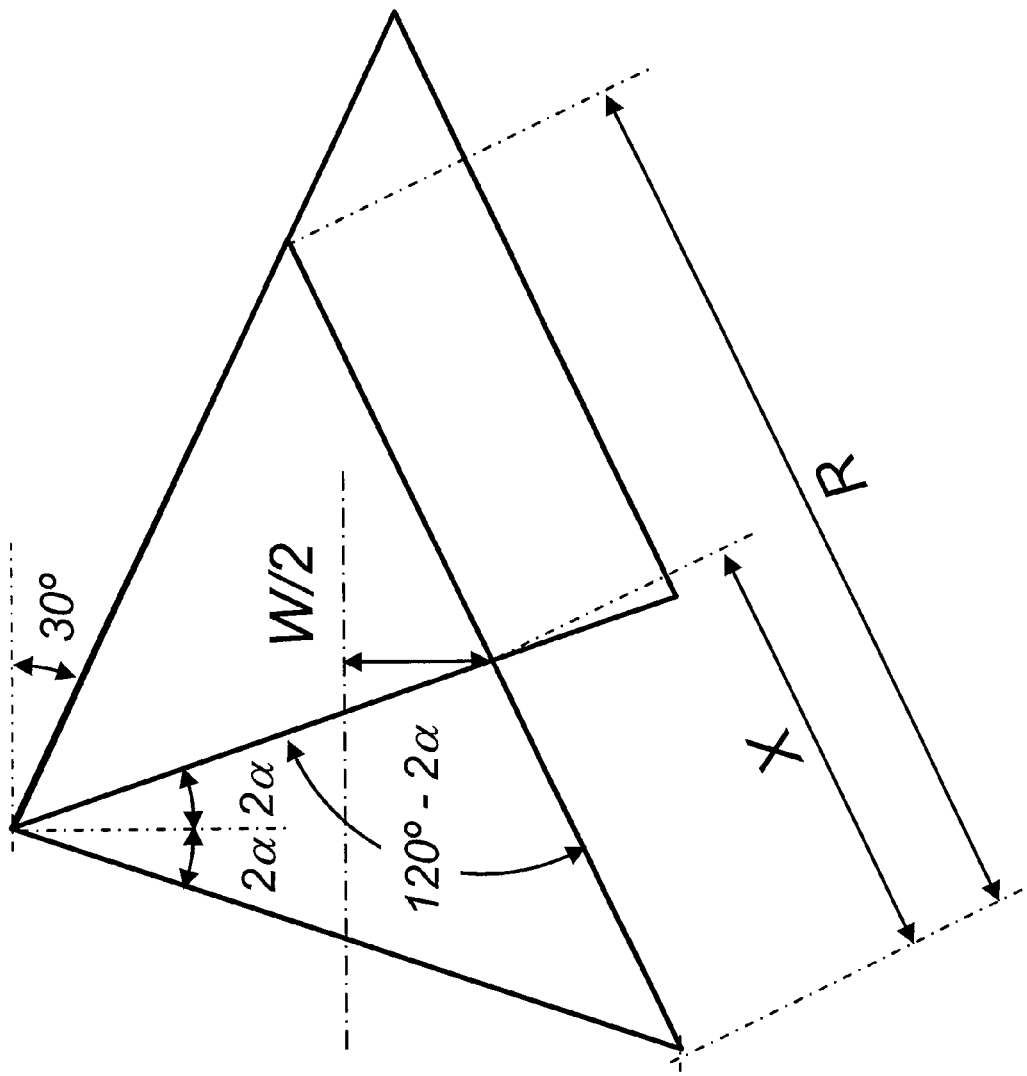

FIG. 5 schematically shows a geometric mapping of events. Rectangular surveillance rate is determined by the "waist" created by the triangular coverage regions from two adjacent receiver legs. Indeed the half the width W/2 is the distance from the path of the transmitting vehicle to the waist point.

FIG. 6 schematically shows the radar device according to the invention used in a combination of a ground vehicle 8 and an aircraft 2. In FIG. 6 it is shown that the transmitter comprises a transmitting antenna 9 being mounted onto the ground vehicle 8. The transmitting antenna 9 transmits a vertically polarized first signal (beam 3 in FIG. 1) in the form of a lobe 10 towards a selected ground area 4 in front of the ground vehicle 8. The transmitting antenna 9 is preferably inclined towards the ground at a Brewster angle being dependent on the index of refraction of the ground. The aircraft 2 flies in a zigzag pattern 1 in order to enhance the synthetic aperture of the previously described SAR. The aircraft 2 comprises the receiver comprising a receiving antenna (not shown) for receiving information in a second lobe 11. The received lobe 11 is transformed into a second signal being used for further signal processing when producing a subsurface image.

The following text is to be read in connection to all FIGS. 1-6.

The principle of diffraction limited synthetic aperture radar is a known method to obtain high 2-dimensional resolution of the ground surface. However, the method has to be changed according to the invention for it to work for subsurface imaging. In order to make it useful it requires a radar configuration with the direction of radiation fairly close to the plane of the ground so as to resolve the ground surface. The depth of a subsurface object will be revealed by short depth of focus of diffraction limited SAR, just as in microscopy.

Basic to the refraction of radiation into the ground is Snell's law of refraction $$\cos \theta_0 = n \cos \theta \quad (1.1)$$

(where the angle is with respect to the ground, which is assumed to be horizontal). Snell's law is complemented by the Fresnel equations for the reflection coefficient $\rho$. For vertical/horizontal polarization (of the electric field) one has respectively $$\rho_V = \left[\frac{n \sin\theta_0 - \sin\theta}{n \sin\theta_0 + \sin\theta}\right]^2, \quad (1.2)$$

$$\rho_H = \left[\frac{n \sin\theta - \sin\theta_0}{n \sin\theta + \sin\theta_0}\right]^2$$

The sum of transmission and reflection coefficients are unity.

A typical index of refraction for ground may be n=5, from which the transmission coefficient is shown in FIG. 3. The angle for which the transmission coefficient is unity for a vertically polarized signal is called the Brewster angle. For the Brewster angle one has according to (1.1) and (1.2)

$$\cos\theta_0 \sin\theta_0 = \cos\theta\sin\theta \Rightarrow \quad (1.2)$$

$$\theta \Rightarrow \frac{\pi}{2} - \theta_0 \Rightarrow \tan\theta_0 = \frac{1}{n}$$

It is evident from the diagram in FIG. 3 that for a near vertical depression angle transmission and reflection coefficients are of the same magnitude. Thus for radiation vertically impingent on the ground there will be about 50% power loss. There will be an equally strong loss for the signal reflected by a subsurface object when again passing the ground air interface, viz. there will an overall loss of 75%. For a ground probing radar with antenna directly above the ground these figures may be acceptable since the ground response can be discriminated by pulse compression. For a standoff radar looking down on the ground from height, the ground response cannot be discriminated due to the curved nature of the wavefront, hitting the ground surface at the fringes at the same time as the center is at the desired depth. Such a radar configuration will therefore not be very useful.

As mentioned SAR relies on shallow depression angles and will thus be highly ineffective for subsurface probing if horizontally polarized. As seen from the diagram the situation will be different for a vertically polarized signal. Indeed if the Brewster angle is used as angle of depression, all power will be refracted into the ground. Reciprocity—applicable at least to the degree that ground is lossless will guarantee that a signal will not be refracted by the ground surface when backscattered from a subsurface target.

Radar wavelength $\lambda$ must be chosen by two conditions:

1. It must be short enough to put the underground objects to be detected above the Rayleigh region with respect to the wavelength inside ground (objects to be detected should have a linear dimension of at least $\lambda/2n$).
2. It must be large enough not to reduce severely the field impingent on top of the ground by shadowing effects caused by ground roughness (ground roughness should have a linear characteristic dimension of not more than $\lambda/8$).

For instance, for flat open fields $\lambda \approx 2$ m may be a suitable choice of wavelength. This assumes that grass, small boulders and the like to be generally of less than 0.3 m extension Propagating into the surface wavelength is shortened by the refraction index n, i.e. around five times for n=5. Thus 2 m wavelength would be resonant to an underground object of 0.2 m extension Zenneck Surface Wave:

Wave propagation along a ground surface at the Brewster angle is peculiar and deserve a detailed treatment in order that a more definite suggestion on a radar design can be given. As it turns out the propagation effects are closely related to electromagnetic surface waves in the sense of Zenneck. As soon as the dielectric has some degree of conductivity wave propagation at the Brewster angle will support a surface wave, with the precise property that it does not give rise to any reflected wave. In the case of a truly lossless ground medium, the surface component will be absent and a reflectionless refraction process occur.

Consider a half space $z \leq 0$ with conductivity $\kappa$ and permittivity $\in$, and assume z>0 to be vacuum with zero conductivity and permittivity $\in_0$, Assume the entire space to be non-magnetic with permeability $\mu_0$. The question which will be illuminated here is whether there exist radiation bounded to the x,y-plane, viz. with no free radiation component in either the z or the −z direction.

We shall assume propagation in the x,z-plane, viz. with a magnetic field with the one non-vanishing component $H_y(x, z)$. There can be two electric components $E_x(x,z)$ and $E_z(x,z)$. The non-vanishing parts of time separated Maxwell equations reads for $Z \leq 0$ $$\left.\begin{array}{l}\frac{\partial}{\partial z}E_x - \frac{\partial}{\partial x}E_z = -i\omega\mu_0 H_y \\ -\frac{\partial}{\partial z}H_y = (\kappa + i\omega\varepsilon)E_x \\ \frac{\partial}{\partial x}H_y = (\kappa + i\omega\varepsilon)E_z\end{array}\right\} \quad (2.1)$$

which implies $$\frac{\partial^2}{\partial z^2} H_y + \frac{\partial^2}{\partial x^2} H_y = i\omega\mu_0(\kappa + i\omega\varepsilon)H_y \quad (2.2)$$

This supports a solution for $z \leq 0$ $$H_y = b\exp(\sqrt{w^2-k^2}z - iwx) \quad (2.3)$$

where $$k^2 = -i\omega\mu_0(\kappa + i\omega\in) \quad (2.4)$$

Because the solution should be a wave bounded to and propagating along the plane $z=0$, it must decay for $Z \to -\infty$ so $\mathrm{Re}\sqrt{w^2-k^2} > 0$. For $z>0$ we get in a corresponding fashion $$H_y = b_0 \exp(-\sqrt{w_0^2 - k_0^2}z - iw_0 x)$$

$$k_0^2 = \omega^2 \mu_0 \in_0 \quad (2.5)$$

Notice that $k_0$ is real and in fact the wavenumber of the time separated Maxwell equation. We are however not free to stipulate that this wavenumber represents a plane wave. The wave must decay for $z \to \infty$ so $\mathrm{Re}\sqrt{w_0^2 - k_0^2} > 0$. Note that $k$ is the wavenumber of the subsurface part of the same wave. $k_0$ can assume any value and knowing the material constants $\kappa$, $\in$, $\in_0$, and $\mu_0$, we may compute k from this value. w and $w_0$ will be determined from boundary conditions.

The electric fields are determined from (2.1). For $z \leq 0$ $$E_x = -\frac{1}{\kappa + i\omega\varepsilon}\frac{\partial}{\partial z}H_y = \frac{i\omega\mu_0}{k^2}\frac{\partial}{\partial z}H_y \quad (2.6)$$

$$E_z = \frac{1}{\kappa + i\omega\varepsilon}\frac{\partial}{\partial x}H_y = -\frac{i\omega\mu_0}{k^2}\frac{\partial}{\partial x}H_y$$

and thus $$E_x = i\omega\mu_0 \frac{\sqrt{w^2 - k^2}}{k^2} b\exp\left(\sqrt{w^2 - k^2}\,z - iwx\right) \quad (2.7)$$

$$E_z = -\omega\mu_0 \frac{w}{k^2} b\exp\left(\sqrt{w^2 - k^2}\,z - iwx\right)$$

For $z > 0$ $$E_x = -\frac{1}{i\omega\varepsilon}\frac{\partial}{\partial z}H_y = \frac{i\omega\mu_0}{k_0^2}\frac{\partial}{\partial z}H_y \quad (2.8)$$

$$E_z = \frac{1}{i\omega\varepsilon}\frac{\partial}{\partial x}H_y = -\frac{i\omega\mu_0}{k_0^2}\frac{\partial}{\partial x}H_y$$

Thus $$E_x = -i\omega\mu_0 \frac{\sqrt{w_0^2 + k_0^2}}{k_0^2} b_0 \exp\left(-\sqrt{w_0^2 - k_0^2}\,z - iw_0 x\right) \quad (2.9)$$

$$E_z = -\omega\mu_0 \frac{w_0}{k_0^2} b_0 \exp\left(-\sqrt{w_0^2 - k_0^2}\,z - iw_0 x\right)$$

Boundary conditions are that the tangential field components should be continuous in the transition $z \to 0$. Thus $H_y$-component:

$$b_0 \exp(-iw_0 x) = b\exp(-iwx)$$

$E_x$-component:

$$-i\omega\mu_0 \frac{\sqrt{w_0^2 - k_0^2}}{k_0^2} b_0 \exp(-iw_0 x) = \quad (2.10)$$

$$i\omega\mu_0 \frac{\sqrt{w^2 - k^2}}{k^2} b\exp(-iwx)$$

It follows that $b = b_0$; $w = w_0$ and $$\frac{\sqrt{w^2 - k_0^2}}{k_0^2} = -\frac{\sqrt{w^2 - k^2}}{k^2} \Rightarrow \quad (2.11)$$

$$\frac{w^2 - k_0^2}{k_0^4} = \frac{w^2 - k^2}{k^4} \Rightarrow$$

$$w^2 = \frac{k_0^2 k^2}{k^2 + k_0^2} \Rightarrow w = \frac{k_0 k}{\sqrt{k^2 + k_0^2}}$$

It follows moreover that $$\sqrt{w^2 - k^2} = \frac{ik^2}{\sqrt{k^2 + k_0^2}} \quad (2.12)$$

$$\sqrt{w^2 - k_0^2} = \frac{-ik_0^2}{\sqrt{k^2 + k_0^2}}$$

since opposite signs of the root must be chosen according to (2.11).

Inserting (2.11), (2.12) in (2.3) and (2.5) we have $$H_y = b\exp\frac{-ik(k_0 x - kz)}{\sqrt{k^2 + k_0^2}} \Leftarrow z \leq 0 \quad (2.13)$$

$$H_y = b\exp\frac{-ik_0(kx - k_0 z)}{\sqrt{k^2 + k_0^2}} \Leftarrow z > 0$$

When k and $k_0$ are real and positive (as indeed will be seen to be approximately the case), (2.13) represents wave propagation directed along a wave vector $(k_0, -k)$ for $z \leq 0$ and a wave vector $(k, -k_0)$ for $z > 0$. Both directions are into the fourth quadrant in the x,z-plane.

The electric field amplitudes for $z \leq 0$ become according to (2.7)

$$E_x = \frac{-\omega\mu_0}{\sqrt{k^2 + k_0^2}} b\exp\frac{-ik(k_0 x - kz)}{\sqrt{k^2 + k_0^2}} \quad (2.14)$$

$$E_z = \frac{-\omega\mu_0}{\sqrt{k^2 + k_0^2}} \frac{k_0}{k} b\exp\frac{-ik(k_0 x - kz)}{\sqrt{k^2 + k_0^2}}$$

It is seen that $(E_x,E_z)\cdot(k_0,-k) \propto (1,k_0/k)\cdot(k_0,-k)=0$, Viz. the electric field (as well as the magnetic field) are orthogonal to the direction of propagation.

For $z > 0$, (2.9) implies $$E_x = \frac{-\omega\mu_0}{\sqrt{k^2+k_0^2}} b\exp\frac{-ik_0(kx-k_0z)}{\sqrt{k^2+k_0^2}} \quad (2.15)$$

$$E_z = \frac{-\omega\mu_0}{\sqrt{k^2+k_0^2}} \frac{k}{k_0} b\exp\frac{-ik_0(kx-k_0z)}{\sqrt{k^2+k_0^2}}$$

Again it is seen that $(E_x,E_z)\cdot(k,-k_0) \propto (1,k/k_0)\cdot(k,-k_0)=0$.

Let us substitute wavenumbers for the frequency and the material constants.

We have $$k = \frac{\omega n}{c}\sqrt{1 - i\frac{\kappa}{\omega\varepsilon}} \; ; k_0 = \frac{\omega}{c} \quad (2.16)$$

$$\sqrt{k^2+k_0^2} = \frac{\omega n}{c}\sqrt{1 + \frac{1}{n^2} - i\frac{\kappa}{\omega\varepsilon}}$$

where the speed of light $c=1/\sqrt{\mu_0\varepsilon_0}$ and the index of refraction $n=c\sqrt{\mu_0\varepsilon}$ have been introduced. It will be convenient to enhance interpretability further by introducing the vacuum wavelength of the radiation according to $\omega/c=2\pi/\lambda$. Moreover rather than conductivity the concept of critical wavelength $\lambda_c$ (the wavelength for which attenuation is shorter than the wavelength) is introduced according to $$\frac{\kappa}{\omega_c\varepsilon} = 1; \omega = \frac{2\pi c}{\lambda} \Rightarrow \quad (2.17)$$

$$\frac{\kappa}{\varepsilon} = \frac{2\pi c}{\lambda_c} \Rightarrow \frac{\kappa}{\omega\varepsilon} = \frac{\lambda}{\lambda_c}$$

Thus $$k = \frac{2\pi n}{\lambda}\sqrt{1 - i\frac{\lambda}{\lambda_c}} \; ; k_0 = \frac{2\pi}{\lambda} \quad (2.18)$$

$$\sqrt{k^2+k_0^2} = \frac{2\pi n}{\lambda}\sqrt{1 + \frac{1}{n^2} - i\frac{\lambda}{\lambda_c}}$$

The magnetic field amplitudes may thus be re-expressed $$H_y = b\exp-i2\pi\frac{\sqrt{1-i\frac{\lambda}{\lambda_c}}\frac{x}{\lambda} - n\left(1-i\frac{\lambda}{\lambda_c}\right)\frac{z}{\lambda}}{\sqrt{1+\frac{1}{n^2}-i\frac{\lambda}{\lambda_c}}} \Leftarrow z \leq 0 \quad (2.17)$$

$$H_y = b\exp-i2\pi\frac{\sqrt{1-i\frac{\lambda}{\lambda_c}}\frac{x}{\lambda} - \frac{1}{n}\frac{z}{\lambda}}{\sqrt{1+\frac{1}{n^2}-i\frac{\lambda}{\lambda_c}}} \Leftarrow z > 0$$

From which the electric field amplitudes readily follows.

Let us consider the case that $\kappa=0$, viz. $\lambda_c \to \infty$ $$H_y = b\exp-i2\pi\frac{\frac{x}{\lambda} - n\frac{z}{\lambda}}{\sqrt{1+\frac{1}{n^2}}} \Leftarrow z \leq 0 \quad (2.18)$$

$$H_y = b\exp-i2\pi\frac{\frac{x}{\lambda} - \frac{1}{n}\frac{z}{\lambda}}{\sqrt{1+\frac{1}{n^2}}} \Leftarrow z > 0$$

Evidently, in this case $$k_x = \frac{2\pi}{\lambda}\frac{1}{\sqrt{1+n^2}}; k_z = \frac{2\pi}{\lambda}\frac{n}{\sqrt{1+n^2}} \Leftarrow z \leq 0 \quad (2.19)$$

$$k_x = \frac{2\pi}{\lambda}\frac{1}{\sqrt{1+n^2}}; k_z = \frac{2\pi}{\lambda}\frac{1}{n\sqrt{1+n^2}} \Leftarrow z > 0$$

One finds that above or under ground the solution constitutes plane waves with wavenumbers $$\sqrt{k_x^2+k_z^2} = \frac{2\pi}{\lambda} \Leftarrow z \leq 0 \quad (2.20)$$

$$\sqrt{k_x^2+k_z^2} = \frac{2\pi}{\lambda}\frac{1}{n} \Leftarrow z > 0$$

Propagation occurs at an angle of elevation $\theta=\tan^{-1} k_z/k_x$ i.e. at an angle $\theta=\tan^{-1} 1/n$ for $z>0$ and at an angle $\theta=\tan^{-1} n$ for $z \leq 0$. Snell's law of diffraction is satisfied, as is evident from the agreement of the $k_x$ wavenumber components above and under ground.

Material constants for some types of ground are

| | n | $\lambda_c$ |
|---|---|---|
| Dry soil | 3.2 | 11 m |
| Wet soil | 5.5 | 33 m |
| Sand | 3.2 | 83 m |
| Sea water | 8.8 | 0.26 m |

Since $n \gg 1$ in all cases, one may write approximately $$H_y = b\exp-i2\pi\left(\frac{x}{\lambda} - n\sqrt{1-i\frac{\lambda}{\lambda_c}}\frac{z}{\lambda}\right) \Leftarrow z < 0 \quad (2.21)$$

$$H_y = b\exp-i2\pi\left(\frac{x}{\lambda} - \frac{1}{n}\frac{1}{\sqrt{1-i\frac{\lambda}{\lambda_c}}}\frac{z}{\lambda}\right) \Leftarrow z > 0$$

One finds is that up to this approximation the Zenneck wave is not attenuated in the x-direction. This result is not dependent on the conductivity but on the magnitude of the refraction index.

For wavelengths not more than a few meters $\lambda/\lambda_c$ will be small in which case one may by Taylor expansion write $$H_y = b \exp \pi n \frac{z}{\lambda_c} \exp - i2\pi\left(\frac{x}{\lambda} - n\frac{z}{\lambda}\right) \Leftarrow z < 0 \quad (2.22)$$

$$H_y = b \exp - \frac{\pi}{n}\frac{z}{\lambda_c} \exp - i2\pi\left(\frac{x}{\lambda} - \frac{1}{n}\frac{z}{\lambda}\right) \Leftarrow z > 0$$

Again the Zenneck wave is seen to be plane wave character obeying Snell's law of refraction, albeit it will be attenuated in the z-direction. Since n>>1 the propagation occurs at shallow depression angles above ground. The so-called Brewster angle is the angle of a perfect dielectric at which no reflection occurs against a horizontal surface for vertically polarized radiation. It is given by $$\theta_{Brewster} = \tan^{-1}\left(\frac{k_z}{k_x}\right)_{z>0} = \tan^{-1}\frac{1}{n} \quad (2.23)$$

It is thus seen that as $\lambda/\lambda_c \to 0$, the Zenneck wave becomes a plane wave totally refracted into the ground or (by the reciprocity theorem) a plane wave emerging out of the ground without reflection at the boundary.

Assuming $\lambda/\lambda_c \neq 0$ and $n<\infty$, the Zenneck wave will be seen to be attenuated in the x-direction as well. One finds the lowest order imaginary component in the denominator of the exponents of (2.17)

$$\sqrt{1 + \frac{1}{n^2} - i\frac{\lambda}{\lambda_c}} \approx \sqrt{1 - i\frac{\lambda}{\lambda_c}}\left(1 + \frac{1}{2n^2\left(1 - i\frac{\lambda}{\lambda_c}\right)}\right) \approx \quad (2.24)$$

$$\sqrt{1 - i\frac{\lambda}{\lambda_c}}\left(1 + \frac{1}{2n^2} + i\frac{\lambda}{2n^2\lambda_c}\right)$$

Hence instead of (2.21)

$$H_y \approx b \exp \pi\left(n\frac{z}{\lambda_c} - \frac{x}{n^2\lambda_c}\right) \exp - i2\pi\left(\frac{x}{\lambda} - \frac{1}{n}\frac{z}{\lambda}\right) \Leftarrow z < 0 \quad (2.25)$$

$$H_y = b \exp \pi\left(-\frac{z}{n\lambda_c} - \frac{x}{n^2\lambda_c}\right) \exp - i2\pi\left(\frac{x}{\lambda} - \frac{1}{n}\frac{z}{\lambda}\right) \Leftarrow z > 0$$

We thereby obtain four interesting parameters of the Zenneck ground wave viz. the wave tilt $\tan^{-1} 1/n$, the characteristic penetration depth $\lambda_c/n$, the characteristic vacuum extension $n\lambda_c$ and the characteristic propagation range $n^2\lambda_c$. For the materials above—but for sea water—the approximation $\lambda<<\lambda_c$ will be applicable and we obtain

|  | $\tan^{-1} 1/n$ | $\lambda_c/n$ | $n\lambda_c$ | $n^2\lambda_c$ |
|---|---|---|---|---|
| Dry soil | 10° | 3.4 m | 35 m | 112 m |
| Wet soil | 17° | 6.0 m | 181 m | 998 m |
| Sand | 10° | 26 m | 266 m | 850 m |

The analysis makes the physical interpretation of the Zenneck wave plain. It can be summarized as follows. At the Brewster angle a wave incident on the ground along a certain line of propagation will have no reflection component, if there is a perfect impedance matching, so the wave will become totally refracted into the ground, with the propagation line bending according to Snell's law of refraction. However, according to the boundary conditions, the electric field component diminishes in the refraction process, see equations (2.14) and (2.15). The electromagnetic power flux (the Poynting vector) will thus diminish abruptly along the electromagnetic line of propagation when it hits the ground surface. The energy balance can not be saved unless the remaining power is a source for a spreading of the incident wave to larger x-values over the ground surface. The power of the incident wave will thus decline exponentially with growing x-values.

Subsurface Imaging Radar Design:

Based on the preceding theoretical results general radar design aspects for subsurface imaging radar may be given.

The candidate subsurface target is conceived to be of metal and with an extension of at least $\lambda/n \approx 0.2$ m. It will provide a total although maybe diffuse scattering of the incident radar signal. The natural subsurface clutter elements such as stones and tree roots, will have refractive properties similar to the soil itself. Natural ground in homogeneities will also—mostly—occur at smaller length scales than those of true targets. For these reasons subsurface clutter should provide weaker backscattering than true targets. For this effect to be useful for false alarm rejection, radar resolution must be so high that the isolated scattering elements, be they targets or clutter, would normally be isolated within the resolution elements, thus avoiding speckle effects. Hence radar resolution close to radar wavelength must be achieved.

Assuming stationarity of subsurface targets, the SAR principle is suitable to attain this high resolution. By the same reasoning as for ordinary SAR, the entire subsurface volume may be conceived as a reflecting continuous medium, for which each point P scatters independently and in all directions with intensity f(P) assessed by the SAR imaging procedure $$f(P) = \int_{-T}^{T} F(r_{Q_t P}, t) dt \quad (3.1)$$

Here F(r,t) is the pulse compressed radar signal whereas $r_{Q_t P}$ is the "radar" range (range in vacuum corresponding to the delay of the radar return) from the current platform position $Q_t$ to the point P in the radar scene.

For subsurface scatterers, only backscattering directions within an angle $\sin^{-1} (1/n)$ around the ground normal will be refracted through the ground/air interface and give rise to radar returns. Also, the scattered signal from below the ground is reduced by reflection, passing through the ground surface.

As seen in FIG. 3, the subsurface reflection losses are very much affected by polarization. This is of particular significance in the present large surveillance rate application, where depression angle must be small. At the depression angels typical for SAR the use of vertical polarization seems a requirement to achieve illumination both on the actual ground surface (rather than at some fraction of the wavelength above the surface) and to obtain refraction into the ground. Brewster angle incidence is maximizing the surface/subsurface target response with respect to that from objects elevated from the ground. For horizontal polarization 2-way reflection losses are seen to amount to 20 dB attenuation of the backscattered surface/subsurface signal at Brewster angle incidence.

As mentioned, clutter false alarms must be removed in the radar detection process. This can be done by any or a combination of three well-known strategies for SAR target detection:

1) Thresholding the image intensity to exihibit only alarms of a certain strength
2) Group detection, e.g. scanning the image for regular or indicative patterns of alarms. A mine field can be a typical case for group detection.
3) Change detection, comparing images over the same area registered a time apart. Surveying roads are typical applications"

A challenge in subsurface SAR imaging is that the region to be imaged is 3-dimensional whereas range gating and SAR focusing only provides 2-dimensional clutter rejection. As now will be analyzed—SAR imaging at diffraction or wavelength resolution has the property of short depth of field, which can resolve 3-dimensional ambiguities.

The defocusing of SAR images may be modeled sufficiently well by assuming an infinite index of refraction. Thus shallow depression angle SAR, propagates radar signals in (essentially) the horizontal plane to a point on top of the underground target at which point propagation becomes vertical down to the target. Let the underground target be positioned at P=(x,y,−z) along the x-axis and let the SAR path be along the y-axis, viz. $Q_f$=(0,vt,0). The "radar" range from any point y on the SAR path to the subsurface target will be $$r = \sqrt{x^2 + (y-vt)^2} + nz \quad (3.2)$$

For short SAR apertures close to y=0, one may substitute (3.2) for its first order approximation $$r = x + \frac{(y-vt)^2}{2x} + nz \quad (3.3)$$

Thus the SAR imaging principle will attribute equal image amplitude to any pair of image points P=(x,y,−z) and P=(x−nδz,y,−z+δz). Hence there will be no means of discrimination between subsurface and surface responses. A sensitivity to the parameter z will however appear for larger SAR apertures. Indeed carrying out the integral (3.1) for a point P=(x−nδz, y,−z+δz) displaced from the actual target position P'=(x,y,−z), the integral will start to decorrelate if the radar range difference $r_{Q_f}^{P} - r_{Q_f P'}$ becomes larger than a quarter of a wavelength. For half a wavelength difference decorrelation will be complete, viz. the target response will not spread to an image point displaced by the corresponding amount. Based on these observations, we obtain $$\delta r = \frac{x\delta x}{\sqrt{x^2+(y-vt)^2}} + n\delta z = n\delta z \frac{\sqrt{x^2+(y-vt)^2}-x}{\sqrt{x^2+(y-vt)^2}} \approx \quad (3.4)$$

$$\frac{n}{2}\left(\frac{y-vt}{x}\right)^2 \delta z; \delta r = \frac{\lambda}{2} \Rightarrow \delta z \approx \frac{\lambda}{n}\left(\frac{x}{vT}\right)^2$$

Since wavelength resolution imaging requires x≈vT one finds a depth of field δz≈λ/n. With the cited values λ≈2 m and n≈5 one finds δz≈0.4 m. The corresponding results for a finite index of refraction would give more complex formulas but no significant differences as regards depth of field.

3-dimensional discrimination capability could alternatively be obtained by a richer radar raw data set than that of a conventional SAR. For instance, the directivity achieved by a vertically extended SAR antenna can in principle provide 3-dimensional resolution and thus discrimination between surface and subsurface responses. The non-resolvable 3-dimensional surrounding of any subsurface target will contain the vegetation layer above ground and any other subsurface responses down to the penetration depth of the signal. The vegetation layer and the penetration depth are seldom more than a few meters, however. In view of the required meter-size wavelength and the standoff distances required for large surveillance, one must therefore conclude that this requirement on vertical antenna resolution is much too severe to be achievable only by real antenna resolution operating at.

To summarize, the most important aspects on successful subsurface imaging radar seem to be 1) vertical polarization and 2) wavelength resolution to obtain a short depth of field and 3) proper wavelength choice. The use of an exact Brewster angle is not so important since the differences between vertical and horizontal polarization are present in a fairly large angular interval around the Brewster angle.

It was concluded above that for finite soil conductivity, launching a vertically polarized signal with an electric field inclined at the Brewster angle led to a refraction process creating a surface wave signal tapped by continuous refraction into the ground, but without any reflection component. This conclusion is significant for the practical difficulty of housing a low frequency vertically polarized antenna onboard an airborne SAR platform. For the short ranges considered, transmit power will be fairly small, so for an airborne radar it is not required that the transmit antenna has a vertical extension of more than half the wavelength, i.e. in our case of around 1 meter. However even this length would be a concern for a small airborne system, mounted on e.g. an UAV. The fact that the radar signal can be a surface wave can be used to realize subsurface imaging radar by a bistatic arrangement. In such an arrangement the transmitting antenna can be close to the ground and launch a surface wave.

The transmit antenna would typically be mounted on a ground vehicle moving at moderate speed in the x-direction. Being mounted on a vehicle the transmit antenna can be inclined at the Brewster angle and vertically extended a few meters to make the radiated beam vertically narrow and conversion of the radiated energy into a surface wave efficient. The receiving antenna can have a vertical extension less than half a wavelength and thus easily be installed on a UAV or helicopter. The receiving platform would travel in a zigzag fashion above the transmitting ground vehicle, spanning the synthetic aperture by the amplitude of the zigzag motion.

The SAR surface resolution formula is $$\Delta A = \Delta \theta \times \frac{\lambda_c}{2} \times \frac{c}{2B} \quad (3.5)$$

Where Δθ is integration angle and B is bandwidth. Given a center wavelength $\lambda_c$≈2 m, a bandwidth of 100 MHz providing 1.5 m range resolution c/2B seems attainable. This resolution should be matched by a similar azimuth resolution $\Delta\theta\lambda_c/2$. Thus Δθ≈60°.

The SAR aperture length refers to the motion of the phase center, which for a bistatic arrangement is half the amplitude of the actual distance traveled by the receiving platform. Given that characteristic surface propagation ranges may vary from 100 to 1000 meters, one would expect a radar range of 200 m to be practical in most application, i.e. even if the characteristic range for surface wave propagation is 100 m.

The area covered by the zigzag receiver motion is depicted in FIG. 2. Denote the length of the phase center motion for a single leg by B, whereas A is the amplitude of the leg. Thus $$B = \frac{A}{2\cos 2\alpha}; \alpha = \tan^{-1}\frac{v_x}{v_y} \approx \frac{v_x}{v_y} \quad (3.6)$$

where $v_x$ is the velocity component of the receiver in the x-direction as well as the ground velocity of the transmitter. One may assume $v_x \ll v_y$. For the triangular (hashed) area imaged by a single leg one obtain the following requirement for the zigzag amplitude $$\frac{\sin\left(\frac{\pi}{3}+2\alpha\right)}{R} = \frac{\sin\left(\frac{\pi}{3}\right)}{B} \Rightarrow A \approx \frac{2R}{1+2\sqrt{3}\,\alpha} \quad (3.7)$$

The rectangular strip that can be inscribed into the covered (irregular) area is really the useful part of the imaged area. Its width W is therefore of interest. We get from FIG. 3

$$\frac{\sin\left(\frac{2\pi}{3}-2\alpha\right)}{B} = \frac{\sin 2\alpha}{X} \\ \frac{\sin\left(\frac{\pi}{3}-2\alpha\right)}{R-X} = \frac{\sin\frac{\pi}{3}}{\frac{B}{2}+\frac{W}{2\cos 2\alpha}} \Rightarrow \quad (3.8)$$

Again considering a first order approximation in a $$\frac{\sqrt{3}-2\alpha}{2B} = \frac{2\alpha}{X} \\ \frac{\sqrt{3}+2\alpha}{2(R-X)} = \frac{\sqrt{3}}{B+W} \quad (3.9)$$

Thus $$W = 2R - B - \frac{10}{\sqrt{3}}B\alpha \Rightarrow \\ W = R\left(1 - \frac{4}{\sqrt{3}}\alpha\right) \quad (3.10)$$

For instance, if $v_x$=20 m/s (cruise speed of helicopter UAV) and $v_y$=2 m/s one has a =0.1. Then A=297 m and W=154 m according to (3.7) and (3.10) respectively. Area coverage rate is 2 m/s×154 m=307 sqm/s.

Given the depth of field—0.4 m—the height of the underground pixel volumes should be no larger than 0.2 m. For 5 m penetration depth the ground should thus be sliced into 25 subsurface layers, each processed with parameters adjusted for a corresponding electric depth nz. With 1.5 m surface resolution the horizontal pixel dimensions may be 0.5 m×0.5 m. A one leg aperture is flown in 297 m/20 m/s=15 s. During this time the total number of pixels processed will be 25×297/2×154/4=1.3×106. The pixel output rate is about 150 kpixel/s. Given 64 bit complex amplitude format the data output rate is thus 9.8 Mbit/s—a tolerably low number.

There are a number of important practical concerns for this type of radar. Foremost there is the choice of waveform, which is a critical subject due to the large bandwidth required and the short operating range. One possible mode of operation is by waveform generation by an impulse device (e.g. an avalanche diode), with transmit duration equal to the reciprocal of the bandwidth. These devices typically produce mean power in the regime required for ground probing radar GPR. For SAR the extended integration time balances the spreading of radiated energy over a much larger area, so power requirement would be similar to those of GPR. Thus impulse waveforms may be possible waveform candidates. Still impulse waveforms require digitization at least at 200 MHz, which rate is essentially too high for data transfer for subsequent signal processing.

As a remedy, stepped frequency waveforms are useful. They require step bandwidth so large as to allow sufficiently short pulses for the short operating range. However 15 m long pulses may be quite acceptable from an operating point of view, allowing 10 MHz step bandwidth, viz. 10 frequency steps across the radar bandwidth. Impulse devices may be used also for stepped frequency operation but will for 10 steps spill 90% of the power outside the received band. For power efficient operation fast transmit/receive switching of a linear transmitter must be attained, viz. switching a 200 MHz carrier with switching times of the order 50 ns.

The second practical concern is that of reducing motion uncertainties in the SAR configuration. Both the motion of the transmitting ground platform relative to the ground and the relative motion between airborne receiving and transmitting ground platform must be known. For SAR image formation the accuracy of knowledge of the motion must be within some fraction of the wavelength—say an RMS value of 0.3 m.

The fact that the ground platform has contact with the ground makes a precise determination of its movement on the ground possible by several methods, e.g. laser movement detection techniques. The relative motion between the ground and airborne platforms is simpler to assess than an absolute motion. This is particularly so, since the distance between the platforms is not very great. One option is carrier differential GPS, by which the required high relative accuracy possibly may be attainable. Other options also exist, e.g. beam riding devices where the airborne platform may sense the deviation from a linear flight path laid out by a laser ray from the ground platform.

The invention claimed is:

1. A subsurface imaging radar device comprising a transmitting unit and a receiving unit, the transmitting unit being arranged to transmit a first radio wave signal in a lobe towards a selected ground area at a selected elevation angle close to a horizontal plane in the ground area so that a significant part of the energy in a vertically polarized signal, with reference to the ground, is successively tapped by refraction into the ground area, wherein the transmitting unit is arranged to transmit the first signal as a signal being polarized, with reference to the ground, so that a significant part of the energy of the first signal is refracted into the ground area, wherein the transmitting unit is arranged to transmit the first signal with a wavelength being longer than the size of selected objects above the surface of the ground area, but short enough for detection of selected objects being subsurface, wherein the transmitting unit being arranged to transmit the first signal with a bandwidth being more than 10% of the centre frequency of the first signal for high range resolution, wherein the radar device is a wavelength resolution limited synthetic aperture radar having an azimuth resolution close to or identical to the wavelength of the first signal in order to obtain high azimuth resolution, the receiving unit being arranged to receive a second signal being the reflected first signal from the selected ground area.

2. A subsurface imaging radar device according to claim 1, wherein the radar device is a wavelength resolution limited synthetic aperture radar for obtaining different images on different dielectric depth under the ground surface giving a three dimensional imaging of the ground area.

3. A subsurface imaging radar device according to claim 1, wherein the radar device comprises a transceiver comprising the transmitting unit and the receiving unit.

4. A subsurface imaging radar device according to claim 3, wherein the transceiver is mounted onto an aircraft.

5. A subsurface imaging radar device according to claim 4, wherein the transmitter comprises a transmit antenna with a vertical extension of less than half the wavelength of the transmitted first signal.

6. A subsurface imaging radar device according to claim 4, wherein the aircraft and thus the receiver travels in a zigzag fashion in order to span a synthetic aperture by the amplitude of the zigzag motion.

7. A subsurface imaging radar device according to claim 1, wherein the radar device is a bi-static device comprising the transceiver at a first location and the receiver at a second location distant from the first location.

8. A subsurface imaging radar device according to claim 7, wherein the transmitter is mounted on a ground vehicle moving at moderate speed in a specific direction, and wherein the receiver is mounted to an aircraft arranged to travel in a zigzag fashion above the transmitting ground vehicle thereby spanning a synthetic aperture by the amplitude of the zigzag motion.

9. A subsurface imaging radar device according to claim 8, wherein the transmitter comprises a transmit antenna being inclined at a Brewster angle and being vertically extended enough to make the radiated beam vertically narrow and to make the conversion of the radiated energy into a surface wave efficient.

10. A subsurface imaging radar device according to claim 8, wherein the receiver comprises a receiving antenna having a vertical extension less than half a wavelength of the transmitted first signal.

11. A subsurface imaging radar device according to claim 1, wherein the angle θ is in an angular interval comprising a Brewster angle.

12. A subsurface imaging radar device according to claim 1, wherein the transmitting unit is arranged to transmit the first signal as a signal being polarized essentially perpendicular to the ground area.

13. A subsurface imaging radar device according to claim 1, wherein at least 10% of the energy of the first signal is refracted into the ground area.

14. A subsurface imaging radar device according to claim 1, wherein the bandwidth is more than 10% of the centre frequency of the first signal for high range resolution when the frequency is above 200 Mhz.

15. A subsurface imaging radar device according to claim 1, wherein the bandwidth is more than 25% of the centre frequency of the first signal for high range resolution when the frequency is between 50 Mhz and 200 Mhz.

16. A method for a subsurface imaging radar device including a transmitting unit and a receiving unit, the method comprising transmitting, with a transmitting unit, a first radio wave signal in a lobe towards a selected ground area at a selected elevation angle close to a horizontal plane in the ground area so that a significant part of the energy in a vertically polarized signal, with reference to the ground, is successively tapped by refraction into the ground area, wherein the transmitting unit transmits the first signal as a signal being polarized, with reference to the ground, so that a significant part of the energy of the first signal is refracted into the ground area, wherein the transmitting unit transmits the first signal with a wavelength being longer than the size of selected objects above the surface of the ground area, but short enough for detection of selected objects being subsurface, wherein the transmitting unit transmits the first signal with a bandwidth being more than 10% of the centre frequency of the first signal for high range resolution, wherein the radar device is a wavelength resolution limited synthetic aperture radar having an azimuth resolution close to or identical to the wavelength of the first signal in order to obtain high azimuth resolution, the receiving unit receiving a second signal being the reflected first signal from the selected ground area.

17. A method for a subsurface imaging radar device according to claim 16, wherein the radar device is a wavelength resolution limited synthetic aperture radar for obtaining different images on different dielectric depth under the ground surface giving a three dimensional imaging of the ground area.

18. A method for a subsurface imaging radar device according to claim 16, wherein the radar device comprises a transceiver comprising the transmitting unit and the receiving unit.

19. A method for a subsurface imaging radar device according to claim 18, wherein the transceiver is mounted onto an aircraft.

20. A method for a subsurface imaging radar device according to claim 19, wherein the transmitter comprises a transmit antenna with a vertical extension of less than half the wavelength of the transmitted first signal.

21. A method for a subsurface imaging radar device according to claim 19, wherein the aircraft and thus the receiver travels in a zigzag fashion in order to span a synthetic aperture by the amplitude of the zigzag motion.

22. A method for a subsurface imaging radar device according to claim 16, wherein the radar device is a bi-static device comprising the transceiver at a first location and the receiver at a second location distant from the first location.

23. A method for a subsurface imaging radar device according to claim 22, wherein the transmitter is mounted on a ground vehicle moving at moderate speed in a specific direction, and wherein the receiver is mounted to an aircraft arranged to travel in a zigzag fashion above the transmitting ground vehicle thereby spanning a synthetic aperture by the amplitude of the zigzag motion.

24. A method for a subsurface imaging radar device according to claim 23, wherein the transmitter comprises a transmit antenna being inclined at a Brewster angle and being vertically extended enough to make the radiated beam vertically narrow and to make the conversion of the radiated energy into a surface wave efficient.

25. A method for a subsurface imaging radar device according to claim 23, wherein the receiver comprises a receiving antenna having a vertical extension less than half a wavelength of the transmitted first signal.

26. A method for a subsurface imaging radar device according to any claim 16, wherein the angle is in an angular interval comprising a Brewster angle.

27. A method for a subsurface imaging radar device according to claim 16, wherein the transmitting unit is arranged to transmit the first signal as a signal being polarized essentially perpendicular to the ground area.

28. A method for a subsurface imaging radar device according to claim 16, wherein at least 10% of the energy of the first signal is refracted into the ground area.

29. A method for a subsurface imaging radar device according to claim 16, wherein the bandwidth is more than 10% of the centre frequency of the first signal for high range resolution when the frequency is above 200 Mhz.

30. A method for a subsurface imaging radar device according to claim 16, wherein the bandwidth is more than 25% of the centre frequency of the first signal for high range resolution when the frequency is between 50 Mhz and 200 Mhz.

* * * * *